(12) United States Patent
Fujii et al.

(10) Patent No.: US 9,604,674 B2
(45) Date of Patent: Mar. 28, 2017

(54) REAR VEHICLE-BODY STRUCTURE OF VEHICLE

(71) Applicant: MAZDA MOTOR CORPORATION, Hiroshima (JP)

(72) Inventors: Hiroaki Fujii, Hiroshima (JP); Shuji Muraoka, Iwakuni (JP); Toshiharu Ikeda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/739,803

(22) Filed: Jun. 15, 2015

(65) Prior Publication Data

US 2016/0023685 A1 Jan. 28, 2016

(30) Foreign Application Priority Data

Jul. 22, 2014 (JP) .................. 2014-149142

(51) Int. Cl.
*B62D 25/04* (2006.01)
*B60G 3/01* (2006.01)
*B62D 25/16* (2006.01)
*B62D 25/08* (2006.01)

(52) U.S. Cl.
CPC ............. *B62D 25/04* (2013.01); *B60G 3/01* (2013.01); *B62D 25/087* (2013.01); *B62D 25/088* (2013.01); *B62D 25/16* (2013.01)

(58) Field of Classification Search
CPC ...... B62D 25/04; B62D 25/088; B62D 25/08; B62D 25/087
USPC ................. 280/124.154; 296/193.06
See application file for complete search history.

(56) References Cited

U.S. PATENT DOCUMENTS

| 4,875,733 A * | 10/1989 | Chado ................. | B62D 25/025 |
| | | | 296/198 |
| 2006/0066137 A1* | 3/2006 | Yatabe ................. | B62D 25/08 |
| | | | 296/203.04 |
| 2007/0138837 A1* | 6/2007 | Tomioka ............... | B62D 25/02 |
| | | | 296/203.04 |
| 2008/0007095 A1* | 1/2008 | Wolkersdorfer ....... | B62D 25/02 |
| | | | 296/203.04 |

(Continued)

FOREIGN PATENT DOCUMENTS

| JP | 2002-331959 A | 11/2002 |
| JP | 2013-233855 A | 11/2013 |

*Primary Examiner* — James English
(74) *Attorney, Agent, or Firm* — Studebaker & Brackett PC (57) ABSTRACT

A rear pillar inner provided at a side panel inner and extending upward from a front-side upper portion of a rear wheel house, a rear pillar reinforcement joined to an outside portion of the rear pillar inner, and an outside reinforcing member connecting an outside portion of the side panel inner and the rear wheel house are provided. The rear pillar reinforcement has a rear-side pillar-reinforcement ridge portion extending vertically. The outside reinforcing member has a front-side reinforcing-member ridge portion extending vertically. A lower end portion of the rear pillar reinforcement and an upper end portion of the outside reinforcing member are joined such that the both ridge portions are arranged to align substantially straightly, when viewed from the side, and to slant in such a manner that an upper side thereof is positioned relatively forward compared to a lower side thereof.

8 Claims, 5 Drawing Sheets

(56) References Cited

U.S. PATENT DOCUMENTS

| | | | |
|---|---|---|---|
| 2011/0309657 A1* | 12/2011 | Hutter | B62D 25/04 296/193.06 |
| 2012/0319431 A1* | 12/2012 | Bodin | B62D 29/007 296/203.03 |
| 2013/0049405 A1* | 2/2013 | Kurogi | B62D 25/04 296/203.01 |
| 2013/0169005 A1* | 7/2013 | Okamachi | B62D 25/08 296/193.08 |
| 2013/0200650 A1* | 8/2013 | Matsuoka | B62D 21/155 296/187.1 |
| 2013/0278022 A1* | 10/2013 | Arikai | B62D 25/04 296/202 |
| 2014/0028056 A1* | 1/2014 | Nishimura | B62D 25/04 296/193.06 |
| 2014/0319877 A1* | 10/2014 | Hida | B62D 25/02 296/191 |

* cited by examiner

REAR VEHICLE-BODY STRUCTURE OF VEHICLE

BACKGROUND OF THE INVENTION

The present invention relates to a rear vehicle-body structure of a vehicle, and in particular, relates to the rear vehicle-body structure of the vehicle comprising a pillar reinforcement and a reinforcing member connecting an outside portion, in the width direction of the vehicle, of a side panel inner and a rear wheel house.

Conventionally, a suspension of the vehicle is provided with a damper to damp (suppress) vibrations and impacts during the vehicle's traveling for ensuring the maneuverability and stability of the vehicle operated by a driver. This damper is arranged to slant such that an upper side therefore is positioned relatively inward compared to a lower side thereof, and its upper end is supported at a suspension housing (suspension tower) which is formed above the wheel house. Accordingly, an inward-component of a damper load acting on the suspension housing in a vertical direction acts on a vehicle body, so that there is a problem in that the above-described inward-component of the damper load may cause the side panel inner located near the suspension housing to fall down inward, i.e., there may occur a so-called inward falling-down problem.

A rear suspension housing at a rear portion of the vehicle body is provided at a position which is located on a vehicle-compartment lower side near a rear pillar portion which is provided at the side panel inner. Accordingly, the above-described inward falling-down of the side panel inner is prevented by transmitted the above-described damper load vertically acting on the rear suspension housing to a vehicle-body reinforcing member, such as a roof rail member, via the rear pillar portion which forms an inside wall of a passenger's ingress/egress opening, thereby dispersing the load (the inward-component of the damper load) concentrating at the side panel inner (rear pillar portion).

Figure 10:
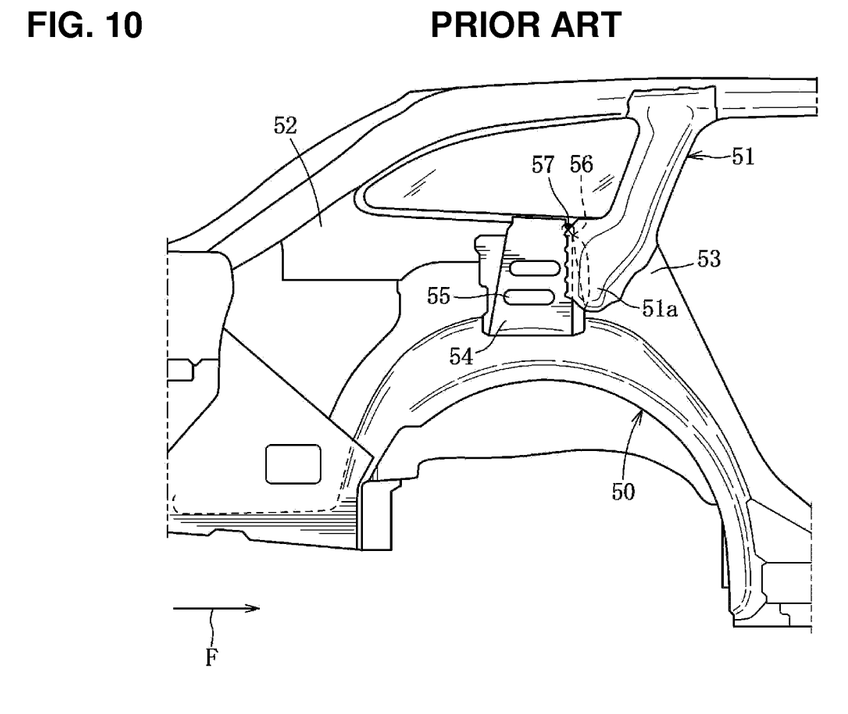
FIG. 10 shows prior art.

A rear vehicle-body structure of a vehicle disclosed in Japanese Patent Laid-Open Publication No. 2013-233855 is configured, as show in FIG. 10, such that a front edge portion and a rear edge portion of a pillar reinforcement 51 which extends upward from a front-side upper portion of a rear wheel house 50 are joined to a pillar portion 53 of a side panel inner 52, respectively, the pillar reinforcement 51 is joined to a reinforcing member 54 which connects the side panel inner 52 and the rear wheel house 50 at its extension portion 51a, a closed cross section 55 is formed by an upper edge portion, a front edge portion, and a rear edge portion of the reinforcing member 54 which are respectively joined to the side panel inner 52, and there is provided a foamed adhesive having a base portion which is positioned in the closed cross section 55 and a first protrusion portion 57 which protrudes out of a first hole portion 56 which is formed a front end of the upper edge portion of the reinforcing member 54 and joins the reinforcing member 54 and the pillar reinforcement 51 together thereby.

According to the rear vehicle-body structure of the vehicle of the above-described patent document, since the reinforcing member 54 and the pillar reinforcement 51 are joined together via the first protrusion portion 57 of the foamed adhesive, it can be restrained for a joining portion of the reinforcing member 54 and the pillar reinforcement 51 to deform, so that the damper load inputted from the damper can be efficiently transmitted to the pillar portion 53 which is continuous to the roof rail, thereby improving the torsional rigidity of the vertical and lateral directions of the vehicle body. However, in a case in which a wheel base is designed to be long from a vehicle-design requirement, a distance between the damper and the pillar portion becomes so long that it becomes difficult to perform the load-transmission function properly. Consequently, there is a concern that torsional deformation of the vehicle as a whole becomes so large that increasing the thickness of steel plates or adding other reinforcing members may be necessary in order to prevent the above-described inward falling-down of the side panel inner.

SUMMARY OF THE INVENTION

An object of the present invention is to provide a rear vehicle-body structure of a vehicle which can achieve both reduction of a vehicle-body weight and prevention of the inward falling-down regardless of the length of the wheel base.

The present invention is a rear vehicle-body structure of a vehicle, comprising a pillar portion provided at a side panel inner of a rear portion of a vehicle body and extending upward from a front-side upper portion of a rear wheel house, a pillar reinforcement joined to an outside portion, in a width direction of the vehicle, of the pillar portion, and a reinforcing member connecting an outside portion, in the width direction of the vehicle, of the side panel inner and the rear wheel house, wherein the pillar reinforcement has a pillar-reinforcement ridge portion extending vertically, the reinforcing member has a reinforcing-member ridge portion extending vertically, and a lower end portion of the pillar reinforcement and an upper end portion of the reinforcing member are joined together such that the pillar-reinforcement ridge portion and the reinforcing-member ridge portion are arranged to align substantially straightly, when viewed from the side, and to slant in such a manner that an upper side thereof is positioned relatively forward compared to a lower side thereof.

According to the rear vehicle-body structure of the vehicle of the present invention, since the pillar-reinforcement ridge portion and the reinforcing-member ridge portion are arranged to align substantially straightly regardless of a longitudinal positional relationship of the rear wheel house and the pillar portion, the damper load inputting to the reinforcing member can be efficiently transmitted to a front side portion of the pillar portion which is spaced apart from the rear wheel house, restraining its dispersion to the side panel inner located near the rear wheel house, so that the damper load's dispersion can be properly dispersed to a vehicle-body reinforcing member, such as the roof rail, via an entire part of the pillar portion. Thereby, the inward falling-down of the side panel inner which is caused by the damper load can be properly prevented, without increasing the plate thickness of steel plates or adding other reinforcing members.

In an embodiment of the present invention, the pillar reinforcement comprises a front-side flange portion which is configured to have a crank-shaped horizontal cross section and joined to the side panel inner, a body portion which connects to the front-side flange portion via a front-side ridge portion extending vertically, and a rear-side flange portion which connects to the body portion via the pillar-reinforcement ridge portion and is joined to the reinforcing member. According to this embodiment, the connectional rigidity of the pillar reinforcement and the reinforcing member can be increased, increasing the rigidity of the pillar portion, so that the transmission efficiency of the damper load to the front side portion of the pillar portion can be increased.

In another embodiment of the present invention, the rear wheel house has a slant face portion which is configured such that a front side thereof is positioned relatively downward compared to a rear side thereof at a top portion thereof, the reinforcing member has a front-end flange portion which extends forward from a lower end of a front wall portion thereof and is joined to the slant face portion of the rear wheel house, and a cross angle of the front wall portion and the front-end flange portion of the reinforcing member is set at substantially 90 degrees. According to this embodiment, a space for welding work between the reinforcing member and the top portion of the rear wheel house can be ensured, so that the connectional rigidity by the welding of the reinforcing member and the top portion of the rear wheel house can be increased.

In another embodiment of the present invention, the rear vehicle-body structure further comprises a suspension housing which connects to the rear wheel house in back of the pillar reinforcement and supports a damper of a suspension, wherein a cross portion of an extension line of the pillar-reinforcement ridge portion and the reinforcing-member ridge portion and the top portion of the rear wheel house is located substantially at the same longitudinal position as a cross portion of an extension line of an axial center of the damper and the top portion of the rear wheel house when viewed from the side. According to this embodiment, the length of a load-transmission path from the damper to the front side portion of the pillar portion can be minimized, so that the transmission efficiency of the damper load can be further increased.

Other features, aspects, and advantages of the present invention will become apparent from the following description which refers to the accompanying drawings.

DETAILED DESCRIPTION OF THE INVENTION

Hereafter, embodiments of the present invention will be described. In the embodiments described, an arrow F shows a forward direction and an arrow L shows a left direction.

Figure 1:
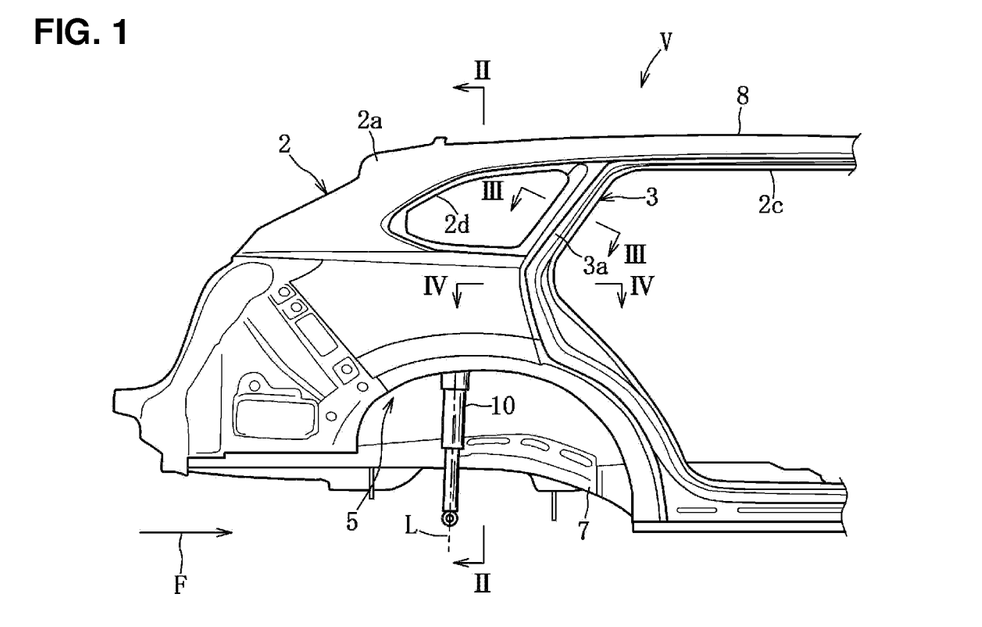
FIG. 1 is a right-side side view of a rear vehicle-body structure of a vehicle according to a first embodiment of the present invention.

A first embodiment of the present invention will be described referring to FIGS. 1-9. As shown in FIGS. 1 and 5, a vehicle V of the present embodiment is a 4-door type of hatch-back vehicle which is provided with a lift gate (not illustrated) at a rear-side portion. The vehicle V comprises a floor panel 1, a pair of right-and-left side panels 2, a pair of right-and-left rear pillars 3, a pair of right-and-left rear pillar reinforcements 4, a pair of right-and-left rear wheel houses 5, a pair of right-and-left outside reinforcing members 6 (reinforcing members), a pair of right-and-left rear suspensions (not illustrated), and others.

Figure 2:
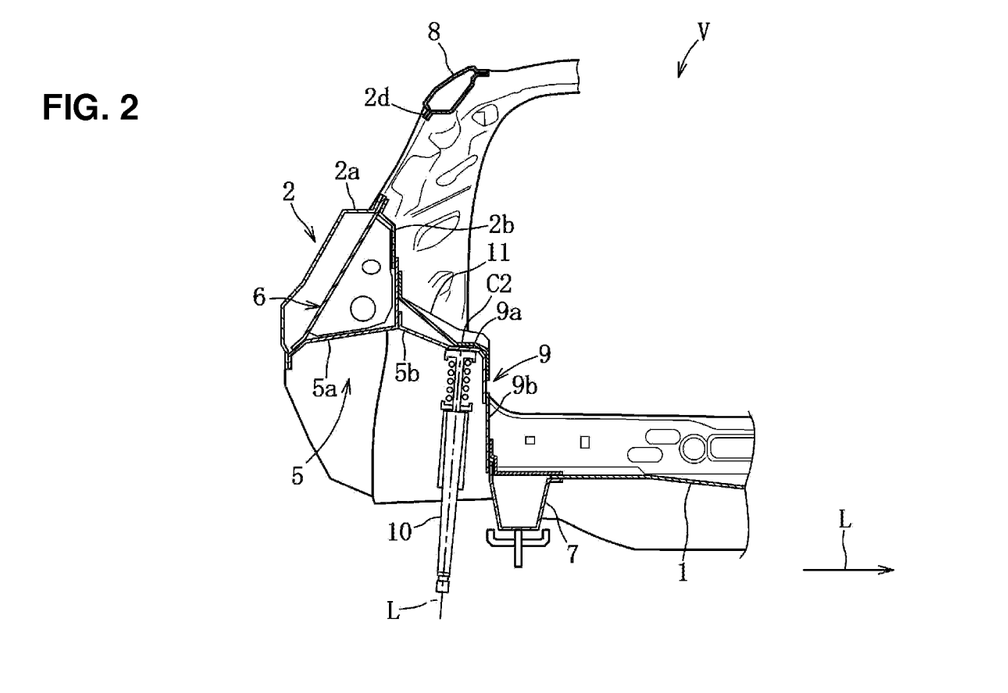
FIG. 2 is a sectional view taken along line II-II of FIG. 1.

The floor panel 1 will be described first. As shown in FIG. 2, the floor panel 1 is provided in a vehicle width direction between the pair of rear side frames 7, extending in a longitudinal direction of a vehicle body, to form a floor face of the vehicle V. The floor panel 1 is provided with a kick-up portion (not illustrated) which is provided at a middle portion of the floor panel 1 to slant rearward and upward, and a rear flower (not illustrated) which forms a baggage room in back of the kick-up portion. A pair of right-and-left rear seats (not illustrated) where passengers are seated are supported at the kick-up portion.

Next, the pair of right-and-left side panels 2 will be described. Herein, each pair of right-and-left members is configured to be symmetrical, so a structure of each right-side member will be described mainly. As shown in FIGS. 1, 2, 4 and 5, the side panel 2 comprises a side panel outer 2a which forms an outer wall of the vehicle body and a side panel inner 2b which forms an inner wall of a vehicle compartment. The side panel outer 2a and the side panel inner 2b form a space portion between them, and plural reinforcing members (reinforcements) are provided in this space portion. The side panel inner 2b is made of a steel plate having a specified thickness, and the rear wheel house 5 is provided at a portion of the side panel inner 2b which corresponds to a top portion of the kick-up portion.

The side panel 2 has a front-side ingress/egress opening (not illustrated) for a passenger of a front seat, a rear-side ingress/egress opening 2c for a passenger of a rear seat, and a quarter-window opening 2d where a rear quarter window glass (not illustrated) is attached. The side panel 2 comprises a roof rail 8 which forms its upper end, a center pillar (not illustrated) which forms a front edge portion of the rear-side ingress/egress opening 2c, a rear pillar 3 which separates the quarter-window opening 2d and the rear-side ingress/egress opening 2c, and others.

Next, the rear pillar 3 will be described. As shown in FIGS. 1, 3-5, the rear pillar 3 comprises a rear pillar outer 3a, a rear pillar inner 3b (pillar portion) which has a roughly hat-shaped cross section, and a rear pillar reinforcement 4 which is vertically-long shaped and provided between the rear pillar outer 3a and the rear pillar inner 3b. The rear pillar outer 3a and the rear pillar inner 3b are integrally formed by the side panel outer 2a and the side panel inner 2b, respectively, and form together a closed cross section which extends obliquely forward and upward from a front-side upper portion of the rear wheel house 5 over the roof rail 8.

Figure 3:
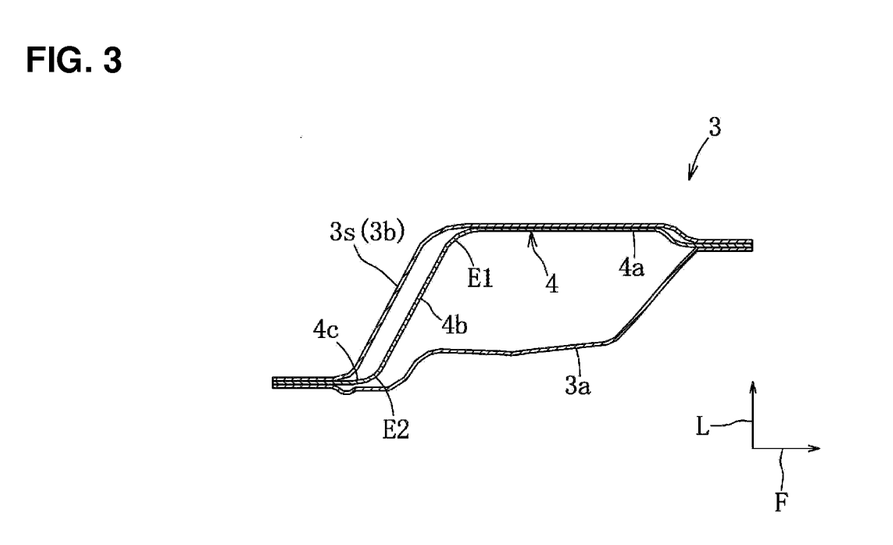
FIG. 3 is a sectional view taken along line III-III of FIG. 1.

The rear pillar inner 3b comprises a straight-shaped slant portion 3s which separates the quarter-window opening 2d and the rear-side ingress/egress opening 2c and an extension portion 3t which extends rearward from a lower end of the slant portion 3s to a position near the top portion of the wheel house 5. As shown in FIG. 3, the slant portion 3s is joined to front-and-rear flange portions of the rear pillar outer 3a at front-and-rear flange portions which are formed at its front-and-rear ends. As shown in FIG. 5, the extension portion 3t is arranged between the quarter-window opening 2*d* and wheel house 5, and extends from a lower end of the slant portion 3*s* to the top portion of the rear wheel house 5.

Next, the rear pillar reinforcement 4 will be described. As shown in FIG. 5, the rear pillar reinforcement 4 is configured in a straight shape, similarly to the slant portion 3*s*, to separate the rear-side ingress/egress opening 2*c* and the quarter-window opening 2*d* when viewed from the side, and its upper-end portion is connected to the roof rail 8 and its lower-end portion is connected to a lower-end portion of the rear pillar inner 3*b* and an upper-end portion of the outside reinforcing member 6. As shown in FIGS. 3-6, and 8, the rear pillar reinforcement 4, which is made of a steel-made panel member, has a horizontal cross section which is roughly crank shaped, and comprises a front-side flange portion 4*a*, a base portion 4*b*, and a rear-side flange portion 4*c* which is provided substantially in parallel to the front-side flange portion 4*a*.

The front-side flange portion 4*a* is spot-welded to the front flange portion of the rear pillar outer 3*a* and the front flange portion of the rear pillar inner 3*b* (the slant portion 3*s* and the extension portion 3*t*) with three-layer joining. The body portion 4*b* is configured to connect to a rear end portion of the front-side flange portion 4*a* via a front-side pillar-reinforcement ridge portion E1 which extends vertically. This body portion 4*b* is arranged such that its upper side is positioned relatively forward compared to its lower side, and also its outward side in the vehicle width direction is positioned relatively rearward compared to its inward side. The rear-side flange portion 4*c* is configured to connect to a rear end portion of the body portion 4*b* via a rear-side pillar-reinforcement ridge portion E2 (pillar reinforcement ridge portion) which extends vertically. This rear-side flange portion 4*c* is spot-welded to the outside reinforcing member 6.

Next, the rear wheel house 5 will be described. As shown in FIGS. 1, 2, 5, 7 and 9, the rear wheel house 5 comprises a wheel house outer 5*a* which protrudes outward in the vehicle width direction from a lower end of the side panel inner 2*b* and a wheel house inner 5*b* which protrudes inward from a lower end of the side panel inner 2*b*. The wheel house outer 5*a* is formed in a partially ring shape, an upper edge portion of which is connected to an arc-shaped lower end portion of the side panel inner 2*b* and a lower edge portion of which is connected to a lower end portion of the side panel outer 2*a*. The top portion of the wheel house outer 5*a* is configured to protrude upward partially and comprises a slant face portion 5*c* which is configured to slant in such a manner that its front side is positioned relatively downward compared to its rear side.

The wheel house inner 5*b* is formed in a partially bowl shape, and a suspension housing 9 which protrudes toward the vehicle compartment is formed at an upper half portion of the wheel house inner 5*b*. As shown in FIG. 2, an upper end portion of the wheel house inner 5*b* is connected to the arc-shaped lower end portion of the side panel inner 2*b*, whereby the wheel house inner 5*b*, the side panel inner 2*b*, and the wheel house outer 5*a* are joined together with three-layer joining A lower end of the wheel house inner 5*b* is connected to the right-side rear side frame 7 which corresponds thereto.

The suspension housing 9 is formed in a roughly L shape, when viewed from the front, and forms a pole-shaped space to accommodate a damper 10. This suspension housing 9 is provided at a central portion, in the longitudinal direction, of the wheel house inner 5*b* which includes a top portion of the wheel house inner 5*b*, and comprises a support portion 9*a* to support an upper end portion of the damper 10 which is configured to slant in such a manner that its upper side is positioned relatively inward compared to its lower side, and a vertical wall portion 9*b*. The support portion 9*a* is configured to extend substantially horizontally at the top portion of the wheel house inner 5*b*, and connected to the side panel inner 2*b* at an outside end portion, in the vehicle width direction, thereof. The vertical wall portion 9*b* extends downward from an inside end portion, in the vehicle width direction, of the support portion 9*a*, and forms a side wall portion of the suspension housing 9.

As shown in FIG. 2, the outside reinforcing member 6 and an inside reinforcing member 11 are connected, at the rear wheel house 5, in a state in which the side panel inner 2*b* is interposed between them. The inside reinforcing member 11 is configured to have a roughly U-shaped cross section, an upper end of which is connected to an inside portion, in the vehicle width direction, of the side panel inner 2*b* and a lower end of which is connected to the wheel house inner 5*b* and the suspension housing 9.

Next, the outside reinforcing member 6 will be described. As shown in FIGS. 2 and 4-9, the outside reinforcing member 6 is configured to have a roughly hat-shaped cross section, and made of a steel plate having a specified thickness and has a horizontal cross section which is roughly U shaped. An upper edge portion of the outside reinforcing member 6 is connected to an outside portion, in the vehicle width direction, of the side panel inner 2*b*, and a lower edge portion of the outside reinforcing member 6 is connected to the wheel house outer 5*a*. Thus, the outside reinforcing member 6 has a closed cross section which extends upward from the vicinity of the top portion of the wheel house outer 5*a*. This closed cross section is configured to slant in such a manner that its upper side is positioned relatively forward compared to its lower side.

Figure 4:
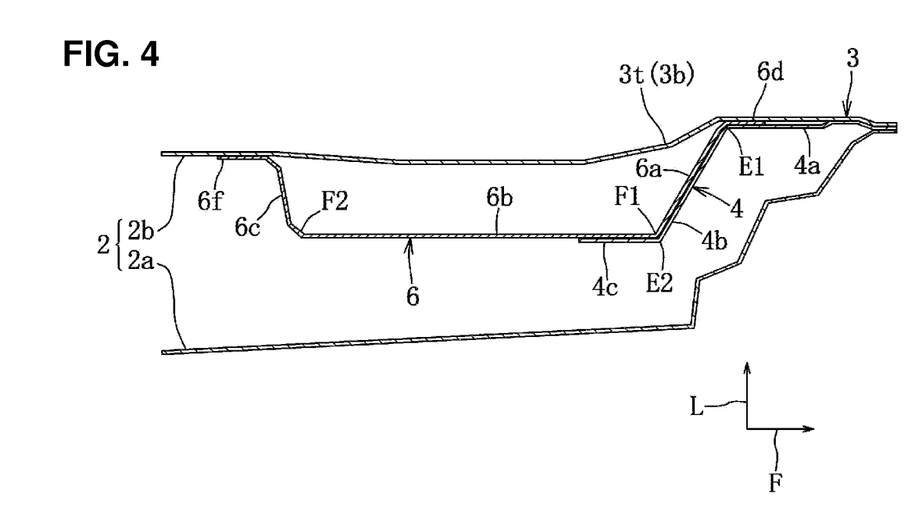
FIG. 4 is a sectional view taken along line IV-IV of FIG. 1.
Figure 5:
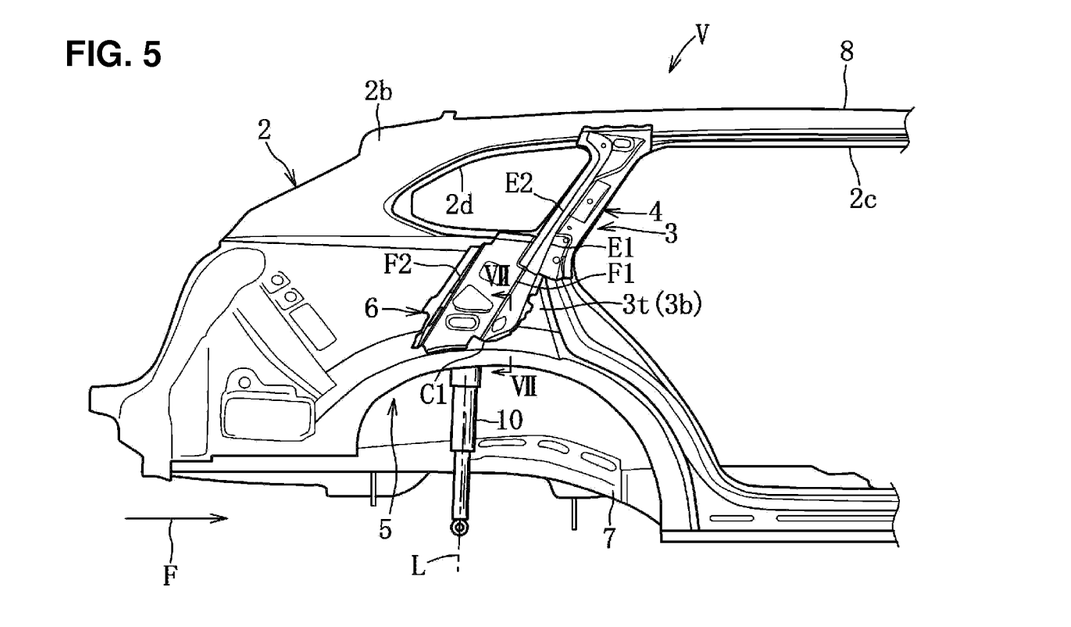
FIG. 5 is a right-side side view of the rear vehicle-body structure in a state in which a side panel outer is removed from a state shown in FIG. 1.
Figure 6:
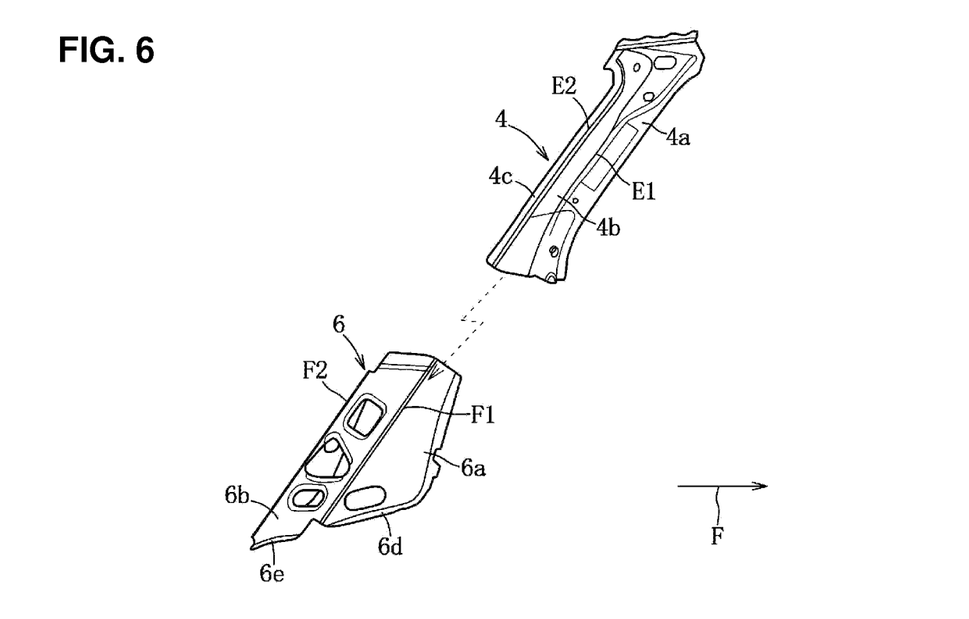
FIG. 6 is an exploded perspective view of a rear pillar reinforcement and an outside reinforcing member.
Figure 8:
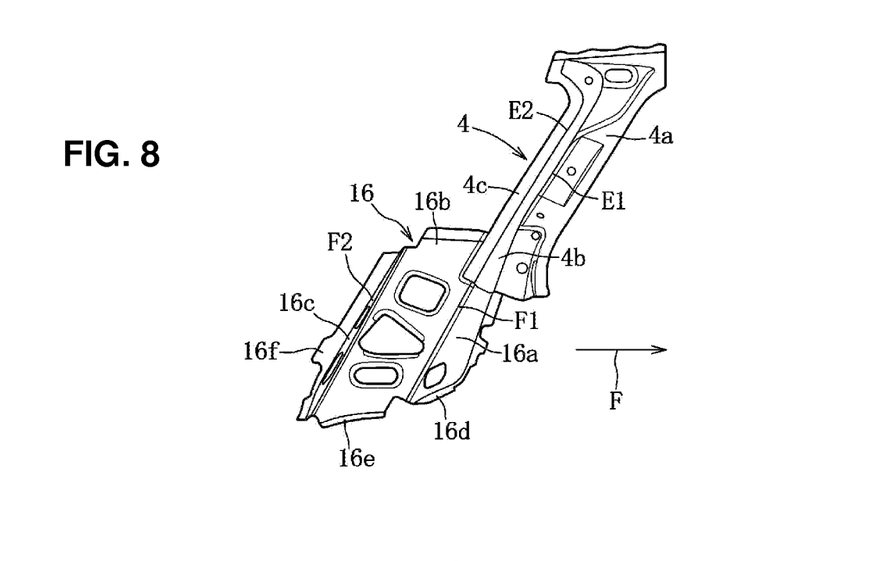
FIG. 8 is a view of the rear pillar reinforcement and the outside reinforcing member which are assembled together.

As shown in FIGS. 4, 6 and 8, the outside reinforcing member 6 comprises a front wall portion 6*a* which extends roughly perpendicularly to the longitudinal direction, a side wall portion 6*b* which is configured to connect to the front wall portion 6*a* via a front-side reinforcing-member ridge portion F1 (reinforcing-member ridge portion) which is formed at an outside end portion, in the vehicle width direction, of the front wall portion 6*a*, and a rear wall portion 6*c* which is configured to connect to the side wall portion 6*b* via a rear-side reinforcing-member ridge portion F2 which is formed at a rear end portion, in the vehicle width direction, of the side wall portion 6*b*.

Figure 7:
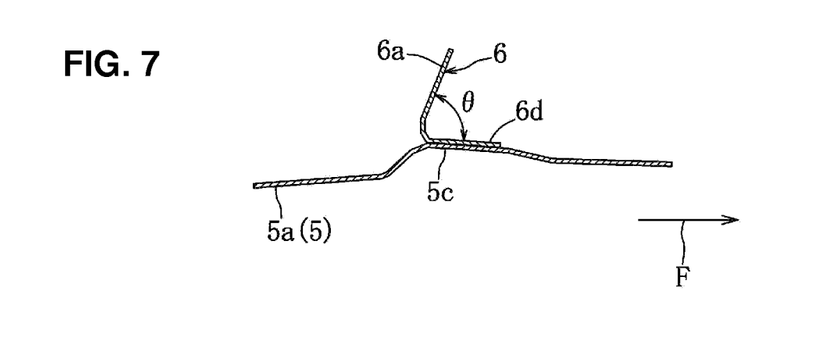
FIG. 7 is a sectional view taken along line VII-VII of FIG. 5.

The front wall portion 6*a* has a front-end flange portion 6*d* which extends forward at a lower end portion thereof and an inside-end portion, in the vehicle width direction, thereof. A lower end of the front-end flange portion 6*d* is joined to the slant face portion 5*c*, and an inside portion, in the vehicle width direction, of the front-end flange portion 6*d* is joined to an outside wall of the extension portion 3*t* (the rear pillar inner 3*b*) by welding. As shown in FIG. 7, a cross angle θ of the lower-end side front-front flange portion 6*d* and the front wall portion 6*a* is set at substantially 90 degrees. Herein, it may be preferable that this cross angle be set within a range of 90-95 degrees, considering the support rigidity and a work space of welding tools.

The side wall portion 6*b* has a side-end flange portion 6*e* which extends outward in the vehicle width direction at its lower end portion. This side-end flange portion 6*e* is joined to a portion of the wheel house outer 5*a* which is located near the top portion of the wheel house outer 5*a*. The rear wall portion 6*c* has a rear-end flange portion 6*f* which extends rearward at a lower end portion thereof and an inside-end portion, in the vehicle width direction, thereof. A lower end of the rear-end flange portion 6f is joined to the upper portion of the wheel house outer 5a, and an inside portion, in the vehicle width direction, of the rear-end flange portion 6f is joined to an outside wall of the side panel inner 2b (the extension portion 3t) by welding.

As shown in FIGS. 5 and 8, an upper end portion of the outside reinforcing member 6 is joined to a lower end portion of the rear pillar reinforcement 4 by welding such that a front and outside portion of the outside reinforcing member 6 is covered with the rear pillar reinforcement 4. As shown in FIG. 4, the front-side reinforcing-member ridge portion F1 and the rear-side pillar-reinforcement ridge portion E2 are arranged to align substantially straightly, when viewed from the side. Also, a ridge portion of the front wall portion 6a and the inside front-end flange portion 6d and the front-side pillar-reinforcement ridge portion E1 are arranged to align substantially straightly, when viewed from the side. Each of these alignment straight lines extends from the wheel house outer 5a toward the roof rail 8, slanting in such a manner that its upper side is positioned relatively forward compared to its lower side.

Figure 9:
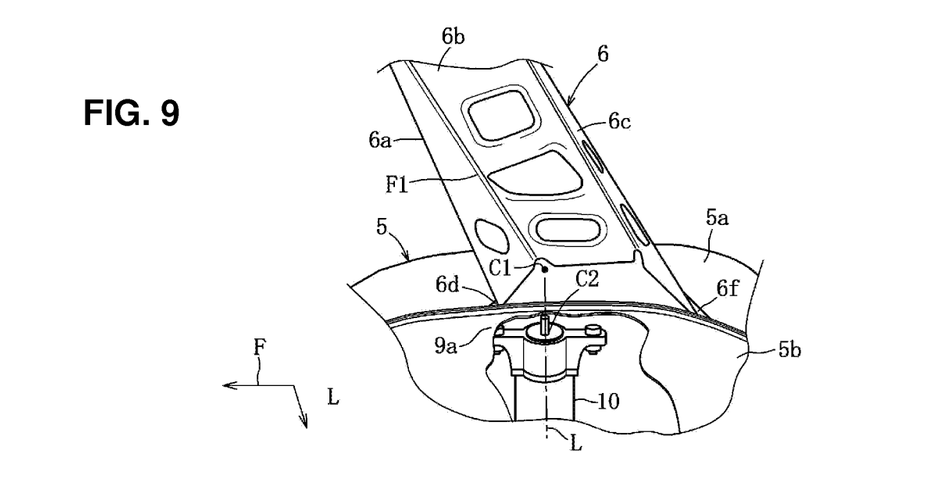
FIG. 9 is a partially broken view around the outside reinforcing member, when viewed from an inside of a vehicle compartment.

As shown in FIGS. 2, 5 and 9, a cross portion C1 of an extension line of the front-side reinforcing-member ridge portion F1 and the rear-side pillar-reinforcement ridge portion E2 and the top portion of the wheel house outer 5a is located substantially at the same longitudinal position as a cross portion C2 of an extension line L of an axial center of the damper 10 and the support portion 9a (the top portion of the wheel house inner 5b), when viewed from the side.

Next, operations/effects of the rear vehicle-body structure of the vehicle according to the present embodiment will be described. According to the rear vehicle-body structure of the vehicle, since the front-side reinforcing-member ridge portion F1 and the rear-side pillar-reinforcement ridge portion E2 are arranged to align substantially straightly regardless of a longitudinal positional relationship of the rear wheel house 5 and the rear pillar inner 3b, the damper load inputting to the outside reinforcing member 6 can be efficiently transmitted to the front side portion of the rear pillar inner 3b which is spaced apart from the rear wheel house 5, restraining its dispersion to the side panel inner 2b located near the rear wheel house 5, so that the damper load's dispersion can be properly dispersed to a vehicle-body reinforcing member, such as the roof rail 8, via an entire part of the rear pillar inner 3b. Thereby, the inward falling-down of the side panel inner 2b which is caused by the damper load can be properly prevented, without increasing the plate thickness of steel plates or adding other reinforcing members.

The rear pillar reinforcement 4 comprises the front-side flange portion 4a which is configured to have the crank-shaped horizontal cross section and joined to the side panel inner 2b, the body portion 4b which connects to the front-side flange portion 4a via the front-side pillar-reinforcement ridge portion E1 extending vertically, and the rear-side flange portion 4c which connects to the body portion 4b via the rear-side pillar-reinforcement ridge portion E2 and is joined to the outside reinforcing member 6. According to this structure, the connectional rigidity of the rear pillar reinforcement 4 and the outside reinforcing member 6 can be increased, increasing the rigidity of the rear pillar inner 3b, so that the transmission efficiency of the damper load to the front side portion of the rear pillar inner 3b can be increased.

The rear wheel house 5 has the slant face portion 5c which is configured such that its front side is positioned relatively downward compared to its rear side at the top portion of the rear wheel house 5, the outside reinforcing member 6 has the front-end flange portion 6d which extends forward from the lower end of the front wall portion 6a and is joined to the slant face portion 5c of the rear wheel house 5, and the cross angle θ of the front wall portion 6a and the front-end flange portion 6d is set at substantially 90 degrees. According to this structure, a space for welding work between the outside reinforcing member 6 and the top portion of the rear wheel house 5 can be ensured, so that the connectional rigidity by the welding of the outside reinforcing member 6 and the top portion of the rear wheel house 5 can be increased.

There is provided the suspension housing 9 which connects to the rear wheel house 5 in back of the rear pillar reinforcement 4 and supports the damper 10 of the suspension. Herein, the cross portion C1 of the extension line of the rear-side pillar-reinforcement ridge portion E2 and the front-side reinforcing-member ridge portion F1 and the top portion of the rear wheel house 5 is located substantially at the same longitudinal position as the cross portion C2 of the extension line L of the axial center of the damper 10 and the top portion of the rear wheel house 5 when viewed from the side. According to this structure, the length of the load-transmission path from the damper 10 to the rear pillar inner 3b can be minimized, so that the transmission efficiency of the damper load can be further increased.

Hereafter, modifications in which the above-described embodiment is partially modified will be described.

While the above-described embodiment describes the example in which the slant face portion is formed by partially protruding the wheel house outer upward, the slant face may be formed by partially recessing the wheel house outer downward, so that a cross angle of the front-end flange portion and the front wall portion may be set at substantially 90 degrees.

Further, the above-described embodiment describes the example in which the front-side reinforcing-member ridge portion and the rear-side pillar-reinforcement ridge portion are arranged to align substantially straightly, and also the ridge portion of the front wall portion and the inside front-end flange portion and the front-side pillar-reinforcement ridge portion are arranged to align substantially straightly, when viewed from the side. However, another structure, in which the front-side reinforcing-member ridge portion and the rear-side pillar-reinforcement ridge portion are arranged to align substantially straightly, but the ridge portion of the front wall portion and the inside front-end flange portion and the front-side pillar-reinforcement ridge portion are not arranged to align substantially straightly, may be adopted.

The present invention should not be limited to the above-described embodiment and modifications, and any other modifications or improvements may be applied within the scope of a spirit of the present invention.

What is claimed is:

1. A rear vehicle-body structure of a vehicle, comprising:
a roof rail extending in a vehicle longitudinal direction and forming an upper end of a side panel;
a pillar portion provided at a side panel inner of a rear portion of a vehicle body, the pillar portion being configured to separate a window opening positioned in back thereof and a passenger's ingress/egress opening positioned in front thereof and extending upward to the roof rail from a front-side upper portion of a rear wheel house;
a pillar reinforcement joined to an outside portion, in a width direction of the vehicle, of the pillar portion and connected to the roof rail at an upper end portion thereof; and a reinforcing member joined to an outside portion, in the width direction of the vehicle, of the side panel inner and connected to the rear wheel house at a lower end portion thereof, wherein said pillar reinforcement has a pillar-reinforcement ridge portion substantially straightly extending vertically, said reinforcing member has a reinforcing-member ridge portion substantially straightly extending vertically, and a lower end portion of the pillar reinforcement and an upper end portion of the reinforcing member are joined together such that said pillar-reinforcement ridge portion extending substantially straightly and said reinforcing-member ridge portion extending substantially straightly are arranged to align substantially straightly from the roof rail to the rear wheel house and to slant in such a manner that an upper side of the pillar reinforcement is positioned relatively forward compared to a lower side of the reinforcing member, when viewed from the side.

2. The rear vehicle-body structure of the vehicle of claim 1, wherein said pillar reinforcement comprises a front-side flange portion which is configured to have a crank-shaped horizontal cross section and joined to the side panel inner, a body portion which connects to said front-side flange portion via a front-side ridge portion extending vertically, and a rear-side flange portion which connects to said body portion via said pillar-reinforcement ridge portion and is joined to said reinforcing member.

3. The rear vehicle-body structure of the vehicle of claim 2, wherein said rear wheel house has a slant face portion which is configured such that a front side thereof is positioned relatively downward compared to a rear side thereof at a top portion thereof, said reinforcing member has a front-end flange portion which extends forward from a lower end of a front wall portion thereof and is joined to said slant face portion of the rear wheel house, and a cross angle of said front wall portion and said front-end flange portion of the reinforcing member is set at substantially 90 degrees.

4. The rear vehicle-body structure of the vehicle of claim 3, further comprising a suspension housing which connects to said rear wheel house in back of said pillar reinforcement and supports a damper of a suspension, wherein a cross portion of an extension line of said pillar-reinforcement ridge portion and said reinforcing-member ridge portion and said top portion of the rear wheel house is located substantially at the same longitudinal position as a cross portion of an extension line of an axial center of said damper and the top portion of the rear wheel house when viewed from the side.

5. The rear vehicle-body structure of the vehicle of claim 2, further comprising a suspension housing which connects to said rear wheel house in back of said pillar reinforcement and supports a damper of a suspension, wherein a cross portion of an extension line of said pillar-reinforcement ridge portion and said reinforcing-member ridge portion and said top portion of the rear wheel house is located substantially at the same longitudinal position as a cross portion of an extension line of an axial center of said damper and the top portion of the rear wheel house when viewed from the side.

6. A rear vehicle-body structure of a vehicle comprising:
a pillar portion provided at a side panel inner of a rear portion of a vehicle body and extending upward from a front-side upper portion of a rear wheel house;
a pillar reinforcement joined to an outside portion, in a width direction of the vehicle, of the pillar portion; and
a reinforcing member connecting an outside portion, in the width direction of the vehicle, of the side panel inner and the rear wheel house, wherein said pillar reinforcement has a pillar-reinforcement ridge portion extending vertically, said reinforcing member has a reinforcing-member ridge portion extending vertically, and a lower end portion of the pillar reinforcement and an upper end portion of the reinforcing member are joined together such that said pillar-reinforcement ridge portion and said reinforcing-member ridge portion are arranged to align substantially straightly, when viewed from the side, and to slant in such a manner that an upper side thereof is positioned relatively forward compared to a lower side thereof, said rear wheel house has a slant face portion which is configured such that a front side thereof is positioned relatively downward compared to a rear side thereof at a top portion thereof, said reinforcing member has a front-end flange portion which extends forward from a lower end of a front wall portion thereof and is joined to said slant face portion of the rear wheel house, and a cross angle of said front wall portion and said front-end flange portion of the reinforcing member is set at substantially 90 degrees.

7. The rear vehicle-body structure of the vehicle of claim 6, further comprising a suspension housing which connects to said rear wheel house in back of said pillar reinforcement and supports a damper of a suspension, wherein a cross portion of an extension line of said pillar-reinforcement ridge portion and said reinforcing-member ridge portion and said top portion of the rear wheel house is located substantially at the same longitudinal position as a cross portion of an extension line of an axial center of said damper and the top portion of the rear wheel house when viewed from the side.

8. A rear vehicle-body structure of a vehicle comprising:
a pillar portion provided at a side panel inner of a rear portion of a vehicle body and extending upward from a front-side upper portion of a rear wheel house;
a pillar reinforcement joined to an outside portion, in a width direction of the vehicle, of the pillar portion; and
a reinforcing member connecting an outside portion, in the width direction of the vehicle, of the side panel inner and the rear wheel house, wherein said pillar reinforcement has a pillar-reinforcement ridge portion extending vertically, said reinforcing member has a reinforcing-member ridge portion extending vertically, and a lower end portion of the pillar reinforcement and an upper end portion of the reinforcing member are joined together such that said pillar-reinforcement ridge portion and said reinforcing-member ridge portion are arranged to align substantially straightly, when viewed from the side, and to slant in such a manner that an upper side thereof is positioned relatively forward compared to a lower side thereof, said rear vehicle-body structure further comprises a suspension housing which connects to said rear wheel house in back of said pillar reinforcement and supports a damper of a suspension, wherein a cross portion of an extension line of said pillar-reinforcement ridge portion and said reinforcing-member ridge portion and said top portion of the rear wheel house is located substantially at the same longitudinal position as a cross portion of an extension line of an axial center of said damper and the top portion of the rear wheel house when viewed from the side.

* * * * *